(12) United States Patent
Howard

(10) Patent No.: US 9,747,080 B2
(45) Date of Patent: Aug. 29, 2017

(54) SOFTWARE DESIGN SHARING SYSTEMS AND METHODS

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 71 days.

(21) Appl. No.: 15/062,761

(22) Filed: Mar. 7, 2016

(65) Prior Publication Data

US 2016/0188300 A1    Jun. 30, 2016

Related U.S. Application Data

(63) Continuation-in-part of application No. 14/306,161, filed on Jun. 16, 2014, now Pat. No. 9,280,320.

(60) Provisional application No. 61/835,254, filed on Jun. 14, 2013.

(51) Int. Cl.
    *G06F 9/44*      (2006.01)

(52) U.S. Cl.
    CPC ............... *G06F 8/20* (2013.01); *G06F 8/30* (2013.01); *G06F 8/36* (2013.01)

(58) Field of Classification Search
    CPC ........................................................ G06F 8/30
    USPC ............................................................ 717/101
    See application file for complete search history.

(56) References Cited

U.S. PATENT DOCUMENTS

| | | | |
|---|---|---|---|
| 5,072,421 A | 12/1991 | Henderson et al. | |
| 6,421,815 B1* | 7/2002 | Seawright | G06F 17/5045 716/105 |
| 6,564,246 B1 | 5/2003 | Varma et al. | |
| 6,606,588 B1* | 8/2003 | Schaumont | G06F 17/5022 703/15 |
| 2004/0215595 A1* | 10/2004 | Bax | G06F 17/30616 |
| 2008/0127065 A1* | 5/2008 | Bryant | G05B 19/056 717/109 |
| 2010/0005203 A1* | 1/2010 | Lambov | G06F 17/148 710/100 |
| 2011/0307433 A1* | 12/2011 | Dlugosch | G06F 15/17362 706/45 |
| 2012/0011481 A1* | 1/2012 | Dwivedi | G06F 17/5081 716/109 |
| 2012/0066664 A1 | 3/2012 | Howard | |
| 2014/0101636 A1* | 4/2014 | Correll | G06F 8/34 717/113 |

(Continued)

OTHER PUBLICATIONS

Dan Olds; "Is there a Blue Cheetah in Your Future?"; The Register website (www.theregister.co.uk); Oct. 20, 2010.*

(Continued)

*Primary Examiner* — Qing Chen
*Assistant Examiner* — Clint Thatcher
(74) *Attorney, Agent, or Firm* — Lathrop & Gage LLP

(57) ABSTRACT

A system, method and software product shares a software design. A design sharer having machine readable instructions stored within memory of a development server and executable by a processor of the development server interacts with a first user to select a first portion of a first hierarchical software design. The design sharer saves the first portion within a public workspace. The design sharer interacts with a second user having access to the public workspace to select the first portion and inserts the first portion into a second hierarchical software design.

11 Claims, 23 Drawing Sheets

(56) References Cited

U.S. PATENT DOCUMENTS

2014/0310678 A1    10/2014    Howard

OTHER PUBLICATIONS

"Home of SMC: The State Machine Compiler"; SMC webpage (smc.sourceforge.net); Nov. 20, 2011.*

Chorfi, A.; Zidani, A.; Lezzar, F., "Building a shared editing workspace for learners' cooperative programming," Education and e-Learning Innovations (ICEELI), 2012 International Conference on, pp. 1-9, Jul. 2012.

Rodriguez-Covili, J.; Ochoa, S.F.; Pino, J.A.; Favela, J.; Mejia, D.; Moran, A.L., "Designing mobile shared workspaces by instantiation," Computer Supported Cooperative Work in Design, 2009. CSCWD 2009. 13th International Conference on, pp. 402-407, Apr. 2009.

Chorfi, A.; Zidani, A.; Lezzar, F., "Project-Based Learning with a Shared Editor," Advanced Information Systems for Enterprises (IWAISE), 2012 Second International Workshop on, pp. 48-56, Nov. 2012.

Mingyao Qi; Tianhe Chi; Xin Zhang; Jingxiong Huang, "Collaborative Virtual Geographic Environment: concepts, features and construction," Geoscience and Remote Sensing Symposium, 2004. IGARSS '04. Proceedings. 2004 IEEE International, vol. 7, pp. 4866-4869 vol. 7, 2004.

Frez, J.; Baloian, N.; Zurita, G., "Software platform to build gee-collaborative systems supporting design and planning," Computer Supported Cooperative Work in Design (CSCWD), 20121EEE 16th International Conference on, pp. 350-357, 2012.

Chien-Ming Wang; Shyh-Fong Hong; Shun-Te Wang; Hsi-Min Chen, "A dual-mode exerciser for a collaborative computing environment," Software Engineering Conference, 2004. 11th Asia-Pacific, pp.1-9, 2004.

* cited by examiner

1000

| Organization Name | Category Name | Process Name |
|---|---|---|
| XYZ Org | Image Processing | FFT |
| | | Convolution |
| | | Edge Detection |

| Category Name |
|---|
| Image Processing |
| Biometrics |
| Oil and Gas |

| Enter Unique Category Name |
|---|

| Process Name | Process Description Display Button | Input Description Display Button | Output Description Display Button | Keyword List Display Button | I/O Procedures Display Button |
|---|---|---|---|---|---|
| FFT | ○ | ○ | ○ | ○ | ○ |
| Convolution | ○ | ○ | ○ | ○ | ○ |
| | ↑ 1302 | ↑ 1304 | ↑ 1306 | ↑ 1308 | ↑ 1310 |

SOFTWARE DESIGN SHARING SYSTEMS AND METHODS

RELATED APPLICATIONS

This application is a continuation of pending U.S. application Ser. No. 14/306,161, filed Jun. 16, 2014, and which claims priority to U.S. Patent Application Ser. No. 61/835,254, titled "Software Design Sharing Systems and Methods," filed Jun. 14, 2013. Each of the above applications are incorporated herein by reference in their entireties.

BACKGROUND

Although there are models for code sharing (open source, commercial subroutine libraries, etc.), there is currently no software-design-sharing model. Software-design templates like those defined by IEEE Standard 1016-1998 simply allow for the translation between a software design and code. Software-design patterns do not represent a full design; that is, they are only meant to show high-level software-design best practices, execution strategies (task breakout) or program structure, not design to the level where code is to occur.

SUMMARY OF THE INVENTION

The MPT Hierarchical Design model defines work from the most abstract level down to where code occurs. All data flows, control-flow displays, data-storage looping structures, data-transformation processes, and control processes are defined. The design is converted to a single-process form, removing the design details, while keeping the design functionality. Removing the visible details has no effect on the MPT design-to-code-sharing association model (see U.S. patent pending US20120066664 for a full description); thus, the design may still function as a design even though the details are hidden. Hiding design details protects the intellectual property that is the design. This means that, like MPT shared code, it is possible to share design elements without the sharer losing his or her intellectual property. This document describes the MPT Hierarchical Design model, how to convert hierarchical design elements into reusable elements, and the reusable design-element sharing process. The ability to merge sub-graph information into a process is also discussed. This is important as being able to merge and un-merge sub-graphs allows the developer to control the performance as well as the flexibility of the system.

In one embodiment, a method shares a software design. A design sharer having machine readable instructions stored within memory of a development server and executable by a processor of the development server, interacts with a first user to select a first portion of a first hierarchical software design. The design sharer saves the first portion within a public workspace. The design sharer interacts with a second user having access to the public workspace to select the first portion and inserts the first portion into a second hierarchical software design.

In another embodiment, a software design sharing system includes a processor, a memory, a conceptual public workspace that is represented within the memory for storing a first portion of a first hierarchical software design, a conceptual organization workspace that is represented within the memory for storing a remaining portion of the first hierarchical software design, and a design sharer. The design sharer has computer readable instructions stored in the memory that when executed by the processor are capable of: interacting with a first user to select the first portion for storing within the public workspace; interacting with a second user having access to the public workspace to select the first portion; and inserting the first portion into a second hierarchical software design.

In another embodiment, a software product has instructions, stored on non-transitory computer-readable media, wherein the instructions, when executed by a computer, perform steps for software design sharing. The software product includes instructions for interacting with a first user to select a first portion of a first hierarchical software design; instructions for saving the first portion within a public workspace; instructions for interacting with a second user having access to the public workspace to select the first portion; and instructions for inserting the first portion into a second hierarchical software design.

BRIEF DESCRIPTION OF THE FIGURES

FIG. 10 is a table showing exemplary process entries in the public workspace of FIG. 1.

FIG. 11 shows one exemplary list of categories that is displayed when a select category button, of FIG. 8, is selected by the developer.

FIG. 12 shows one exemplary new category entry screen that is displayed by the development server when the developer selects a create category button of the save process screen of FIG. 8.

FIG. 13 shows one exemplary process information request screen that is displayed when a developer double clicks a row within the table of FIG. 9, or the table of FIG. 10.

DETAILED DESCRIPTION OF THE EMBODIMENTS

Hierarchical Design Model

Figure 1:
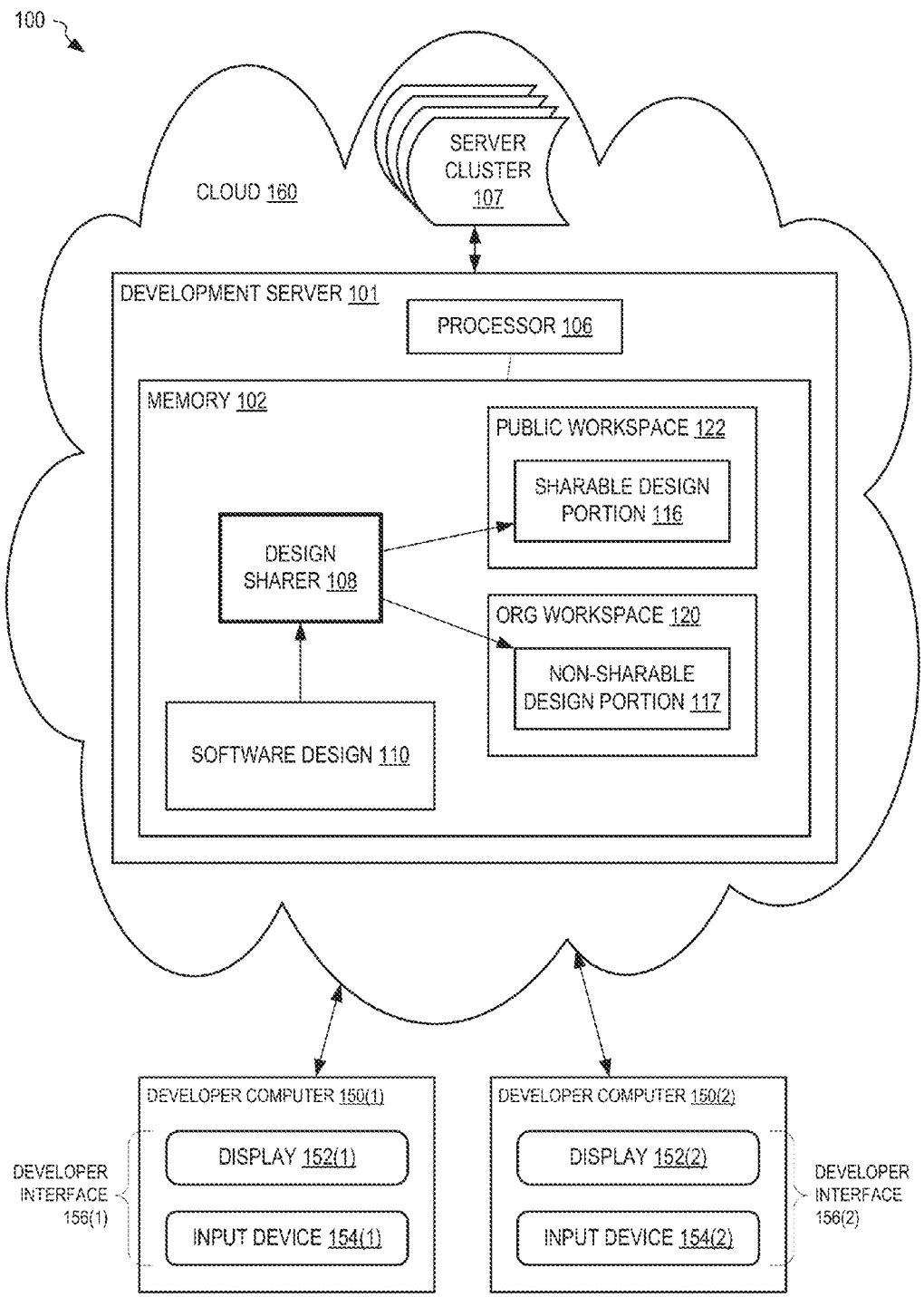
FIG. 1 is a block diagram illustrating one exemplary software design sharing system, in an embodiment.

FIG. 1 is a block diagram illustrating one exemplary software design sharing system 100. System 100 includes a development server 101 that is located, for example, within cloud 160. Cloud 160 represents a computer communication network that may include the Internet and other computer networking technologies.

Development server 101 has a processor 106 and a memory 102 for storing a software design 110. Software design 110 is based upon a massively parallel hierarchical design model that defines work from the most abstract level down to where code occurs. One or more developers each use a developer computer 150 that has a developer interface 156, including a display 152 and an input device 154, to communicate with development server 101 to develop software design 110. For example, developers may develop software design 110 within an organization workspace 120 that is shared between the multiple developers working for a particular organization, wherein developers working for other organizations do not have access to a non-sharable design portion 117 of software design 110 stored within organization workspace 120. Memory 102 also stores a design sharer 108 that has machine readable instructions that are executed by processor 106 to share at least part of software design 110 as sharable design portion 116 within a public workspace 122. Public workspace 122 is for example accessible by developers other than those with access to organization workspace 120.

Figure 2:
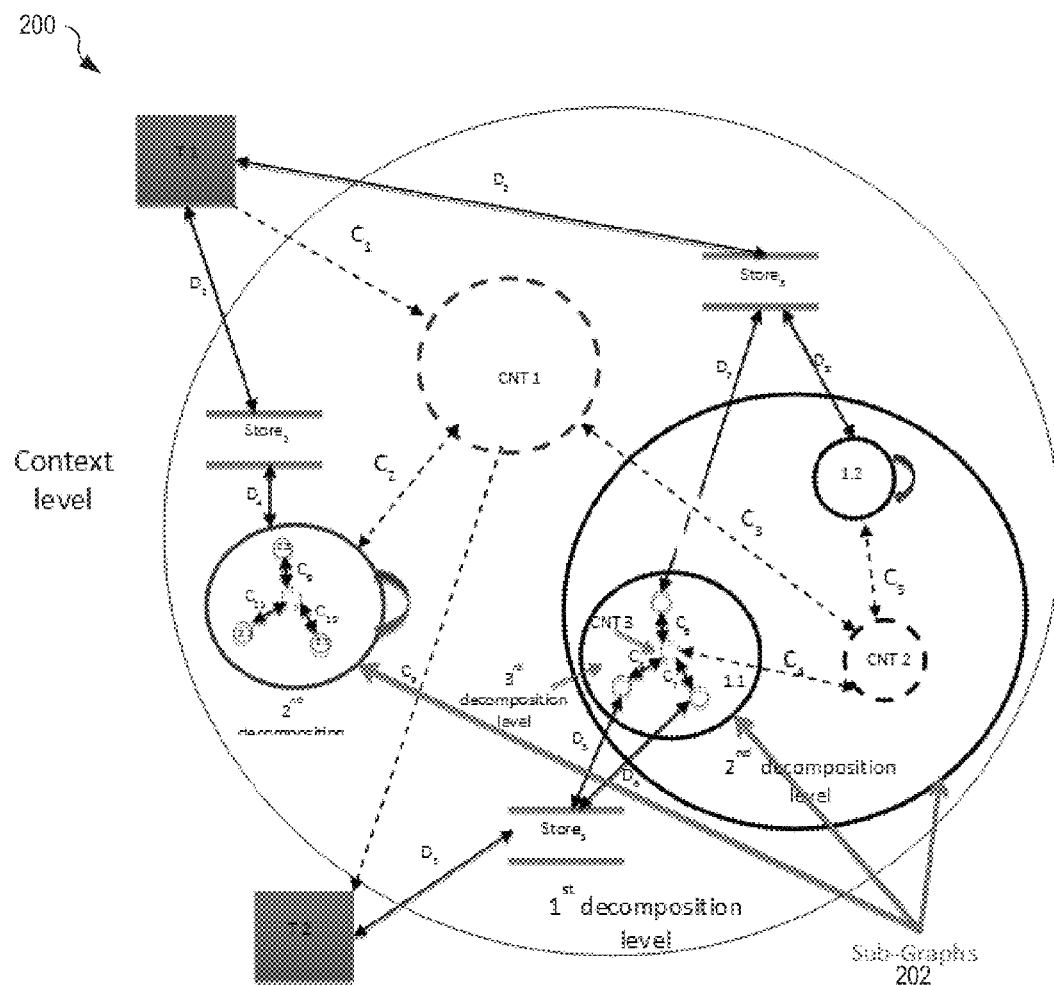
FIG. 2 shows one exemplary hierarchical decomposition graph, illustrating three decomposition levels.

FIG. 2 shows one exemplary hierarchical decomposition graph 200 that represents software design 110 of FIG. 1. Each decomposition level contains one or more sub-graphs 202, one sub-graph for each decomposing process. Each sub-graph 202 may be considered a code snippet in the McCabe sense. Note that a process that decomposes into a single lower-level process is invalid as no additional graph information is added. A process may decompose into a sub-graph with a minimum of two processes on it.

Figure 3:
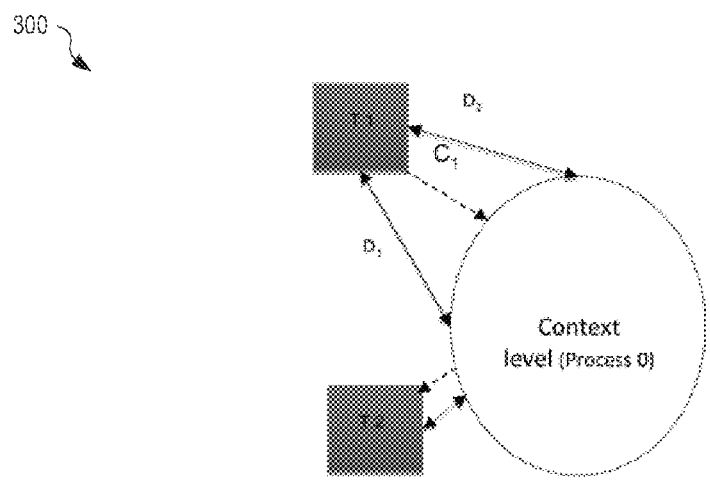
FIG. 3 shows a context level, also known as Level 0, which represents the entire software design of FIG. 1 as a single process ("process 0").
Figure 5:
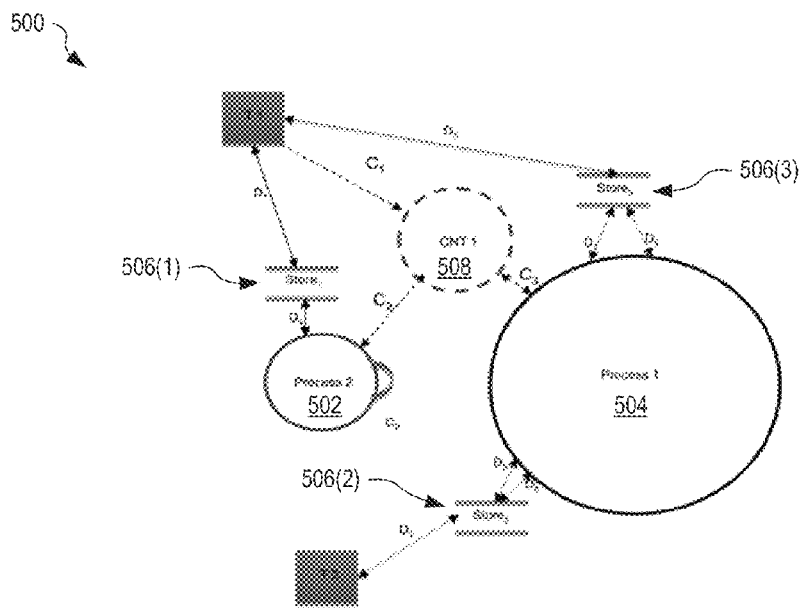
FIG. 5 shows a first decomposition level of context level, of FIG. 3, showing "process 0" decomposed into two internal processes that are couples with multiple data-storage areas.
Figure 6:
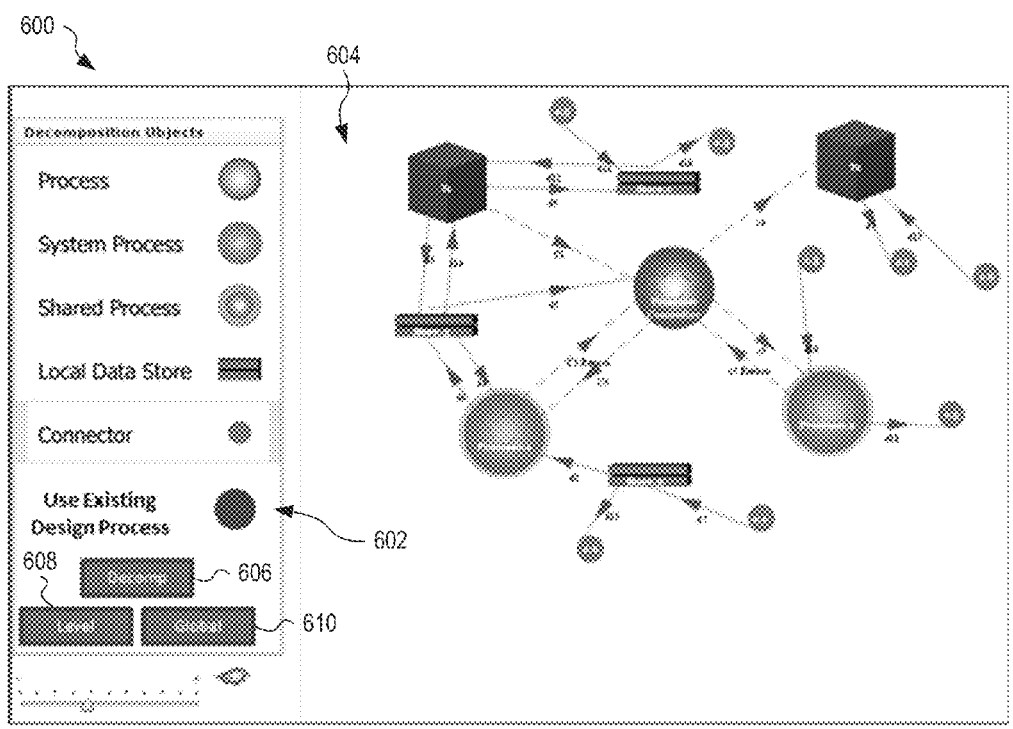
FIG. 6 shows one exemplary screen shot of the first decomposition level of FIG. 5 generated within a sub-graph interaction screen by development server and displayed on development computer.

Software design 110, as represented by hierarchical decomposition graph 200 of FIG. 2, may also be drawn using decomposition levels to hide the overall complexity of software design 110 while retaining McCabe's code-snippet concept. FIGS. 3, 5 and 6 show exemplary graphs that represent software design 110, including a context level 300, and three decomposition levels of sub-graphs 202.

FIG. 3 shows a context level 300, also known as Level 0, which represents the entire software design 110 as a single process ("process 0").

Figure 4:
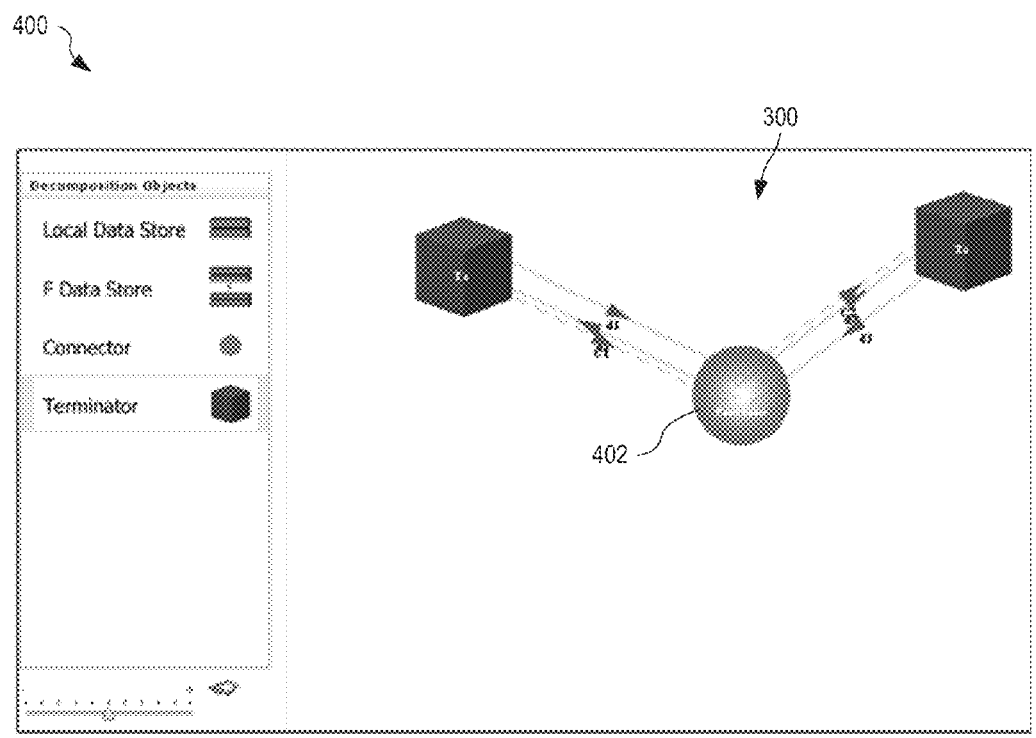
FIG. 4 shows one exemplary screen shot illustrating the context level 0, of FIG. 3, as displayed by the development server of FIG. 1.

FIG. 4 shows one exemplary screen shot 400 illustrating context level 300 as displayed by development server 101 via one or more of development computers 150, wherein process 402 represents "process 0" of context level 300.

FIG. 5 shows a first decomposition level 500 of context level 300 of FIG. 3, showing "process 0" decomposed into two internal processes 502 and 504 that are couples with multiple data-storage areas 506(1)-(3).

FIG. 6 shows one exemplary screen shot 600 of first decomposition level 500 of FIG. 5 generated within a sub-graph interaction screen 604 by development server 101 and displayed on development computer 150. Note that context level 300 contains first decomposition level 500.

Figure 7:
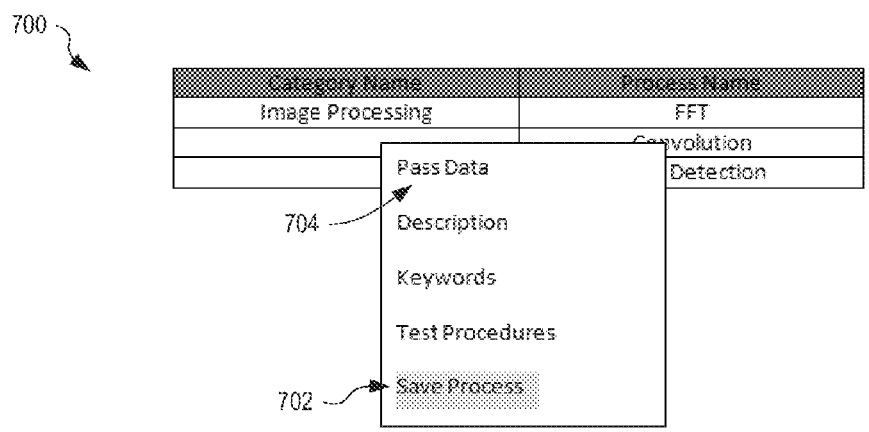
FIG. 7 shows one exemplary process options selection list that is displayed when a designer, using the development computer, of FIG. 1, for example, right-clicks on the context level 0 of FIG. 3.
Figure 8:
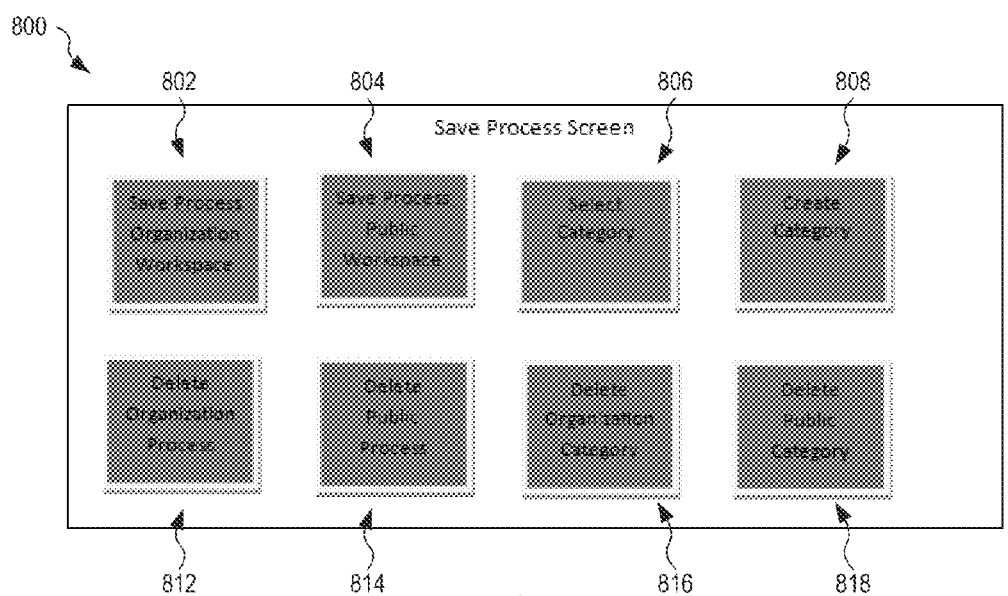
FIG. 8 shows one exemplary save process screen 800 that is displayed when save process button of FIG. 7 is selected.

FIG. 7 shows one exemplary process options selection list 700 that is displayed when a designer, using development computer 150 for example, right-clicks on context-level process 402 ("Process 0"). One option in process options selection list 700 is a save process button 702. FIG. 8 shows one exemplary save process screen 800 that is displayed when save process button 702 is selected. A developer selects save process button 702 to save the current process, along with its input/output data flows, description, keyword list, associated test procedures, and associated code, for future recall.

Figure 9:
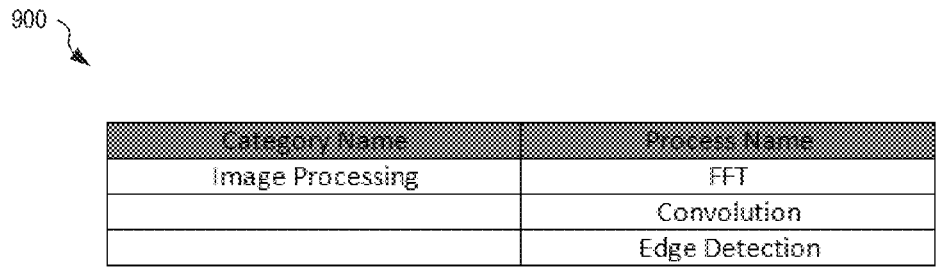
FIG. 9 is a table showing exemplary process entries in the organization workspace of FIG. 1.

To save a process, the workspace is first selected. There are two possible workspaces (places to store a process): organization workspace 120 and public workspace 122. Where the developer selects a save process organization workspace button 802 of save process screen 800, the process and its contents are stored as non-sharable design portion 117 within organization workspace 120 and is accessible only to members (e.g., developers) of the creating organization. All entries in organization workspace 120 are grouped by category name and process name. FIG. 9 is a table 900 showing exemplary organization workspace process entries.

Where the developer selects a save process public workspace button 804 of save process screen 800, the process and its contents are stored as sharable design portion 116 within public workspace 122 and any organization (e.g., developer) may access the process. All entries in public workspace 122 are grouped by organization name, category, and process name. In public workspace 122, only the top-most level of the process is visible and none of the information associated with the process may be changed. FIG. 10 is a table 1000 showing exemplary public workspace process entries.

Once the workspace for storing the process is selected, the developer next selects either an existing category or a new category for the process. Categories are groupings of "like" processes. For example, an "Image Processing" category may be used to store FFT, Convolution, and edge-detection processes.

FIG. 11 shows one exemplary list 1100 of categories that is displayed when a select category button 806 is selected by the developer. Selection of one category from list 1100 causes the current process to be stored under that category.

FIG. 12 shows one exemplary new category entry screen 1200 that is displayed by development server 101 when the developer selects a create category button 808 of save process screen 800. Using screen 1200, development server 101 requests a unique category name from the developer, and then stores the current process under that category.

Only an authorized member of an organization using system 100 may save or delete a process or category created by that organization. This is true for adding or deleting a process or category in both organization workspace 120 and public workspace 122. Deleting either a category or process is analogous to creating one, with the only difference being the selection of the delete organization process button 812, delete public process button 814, delete organization category button 816, and delete public category button 818 of save process screen 800, FIG. 8.

Using Saved Processes

To use a saved process, the "Use Existing Design Process" pull-down 602 is selected, as shown in FIG. 6, which causes system 100 to display the organization and public options. Selecting the organization option causes table 900 of FIG. 9 to display the organization workspace process entries. Selection of a row within table 900 allows that process to be dragged and dropped onto sub-graph interaction screen 604. Where the developer selects the public option from pull-down 602, table 1000 of FIG. 10 is displayed to show public workspace entries. Selecting a row of table 1000 allows that process to be dragged and dropped onto sub-graph interaction screen 604.

FIG. 13 shows one exemplary process information request screen 1300 that is displayed when a developer double clicks a row within table 900, FIG. 9, or table 1000, FIG. 10. Each listed process within screen 1300 has a process description display button 1302, an input description display button 1304, an output description display button 1306, a keyword list display button 1308, and a test procedure display button 1310.

Selecting the Process Description Display button 1302 causes the "process description" display to be shown.

Figure 14:
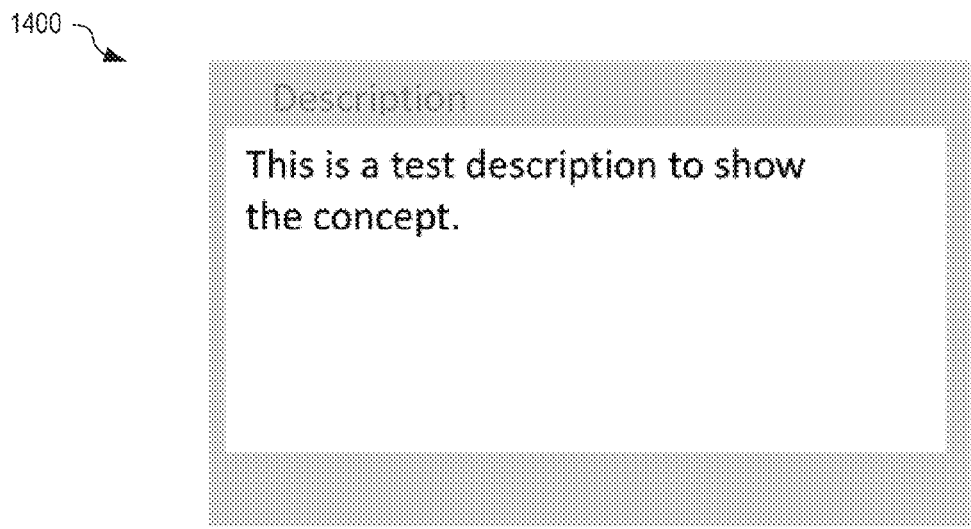
FIG. 14 shows one exemplary process description display screen that is displayed when the developer selects process description display button of FIG. 13.
Figure 15:
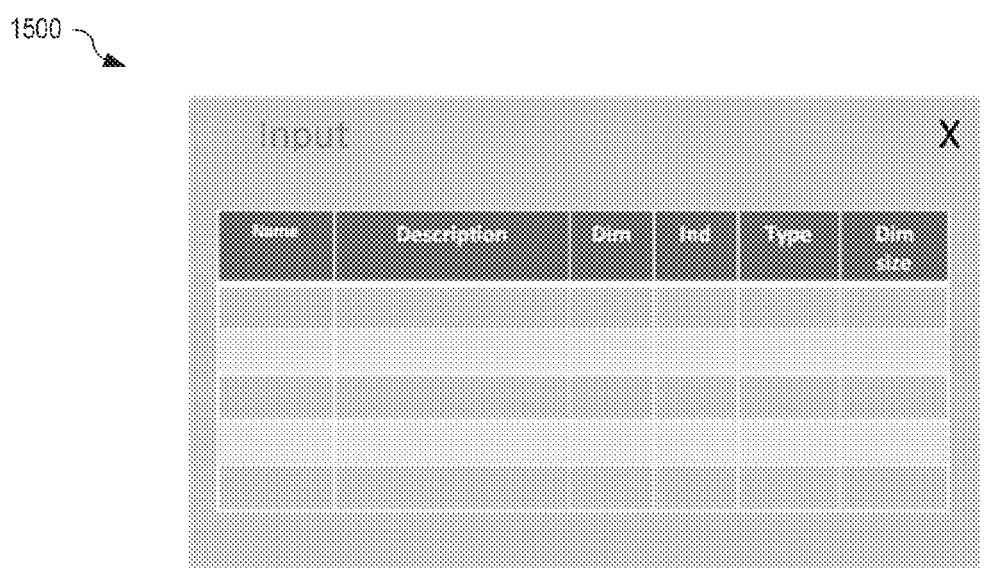
FIG. 15 shows one exemplary input display screen that is displayed when the developer selects input description display button of FIG. 13.

FIG. 14 shows one exemplary process description display screen 1400 that is displayed when the developer selects process description display button 1302. FIG. 15 shows one exemplary input display screen 1500 that is displayed when the developer selects input description display button 1304.

Figure 16:
FIG. 16 shows one exemplary keyword list screen that is displayed when the developer selects keyword list display button of FIG. 13.
Figure 17:
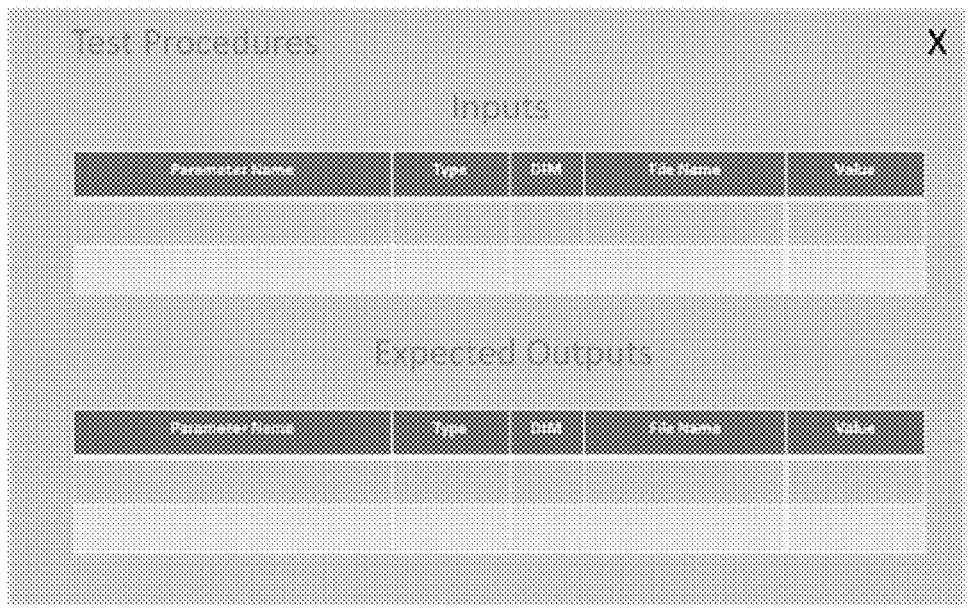
FIG. 17 shows one exemplary test procedure display screen, showing test procedures for the process, that is displayed when the developer selects test procedure display button of FIG. 13.

Note: "Name" is the name of a variable, description is a text description of the variable, "Dim" is the number of dimensions associated with a variable, "Ind" is the number of indirections (pointers) needed to access the variable, "Type" is the data type of the variable, and "Dim Size" is the maximum index size for each dimension of the variable. A similar screen is displayed for output information when the developer selects output description display button 1306. FIG. 16 shows one exemplary keyword list screen 1600 that is displayed when the developer selects keyword list display button 1308. FIG. 17 shows one exemplary test procedure display screen 1700, showing test procedures for the process, that is displayed when the developer selects test procedure display button 1310. Note: Parameter Name is the name of the variable, Type is the type of the variable (integer, real, string, etc.), Dim is the dimensionality of the variable, File Name is the name of a file containing the values that go into a multi-dimensional variable, and Value is the value put into a zero-dimensional variable.

Connecting a Saved Process to the Graph

Figure 18:
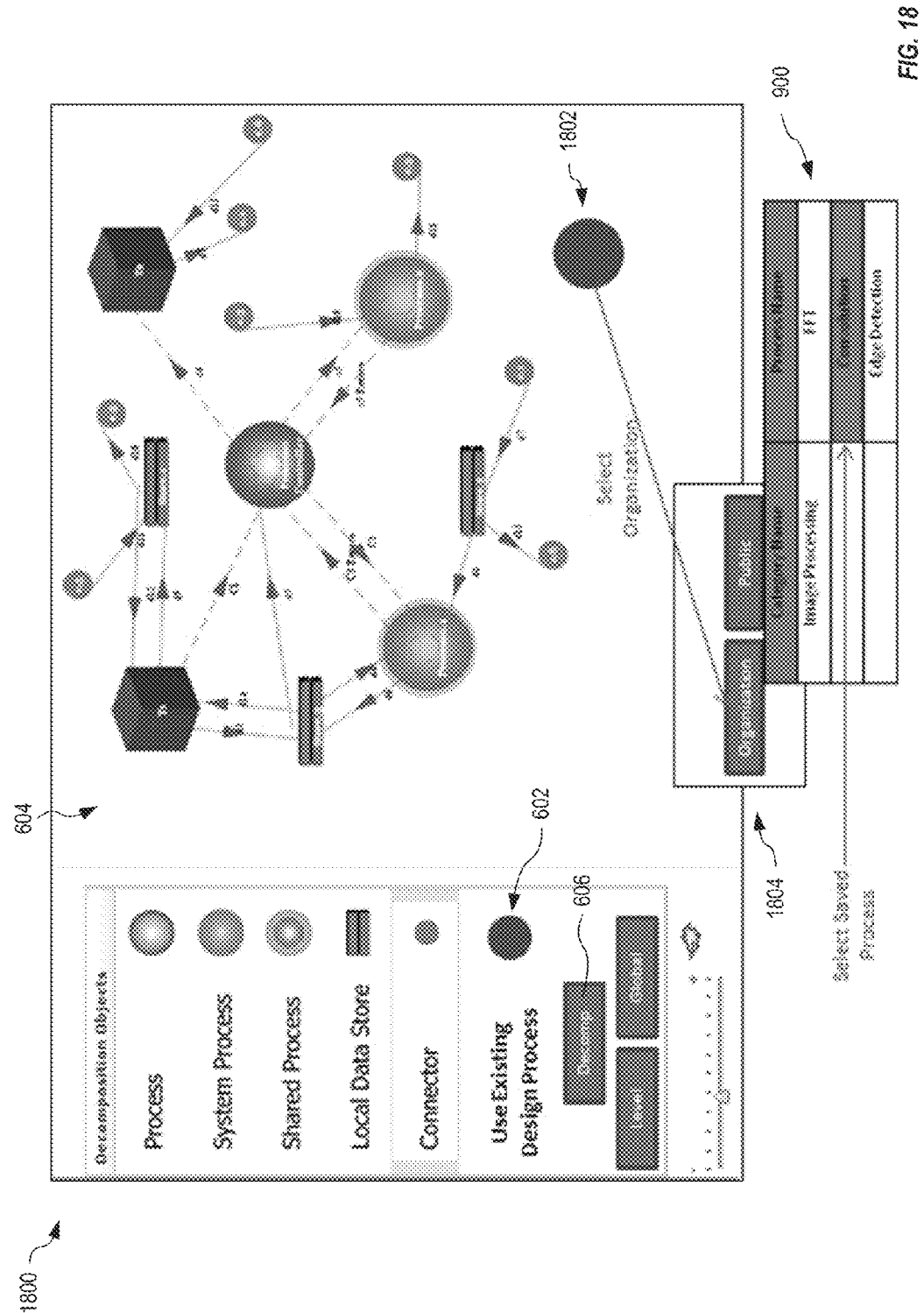
FIG. 18 shows pull-down dragged onto sub-graph interaction screen of FIG. 6 and displayed as a process.

As indicated above, a saved process is dragged and dropped onto sub-graph interaction screen 604 of FIG. 6. FIG. 18 is a screen shot 1800 showing pull-down 602 dragged onto sub-graph interaction screen 604 and displayed as process 1802. This action automatically displays workspace selection buttons 1804, and, in turn, table 900 of FIG. 9, wherefrom the saved process is selected. As input and output data flows are connected to process 1802, the variables are automatically used without changing the definitions provided when the process was saved.

Figure 19:
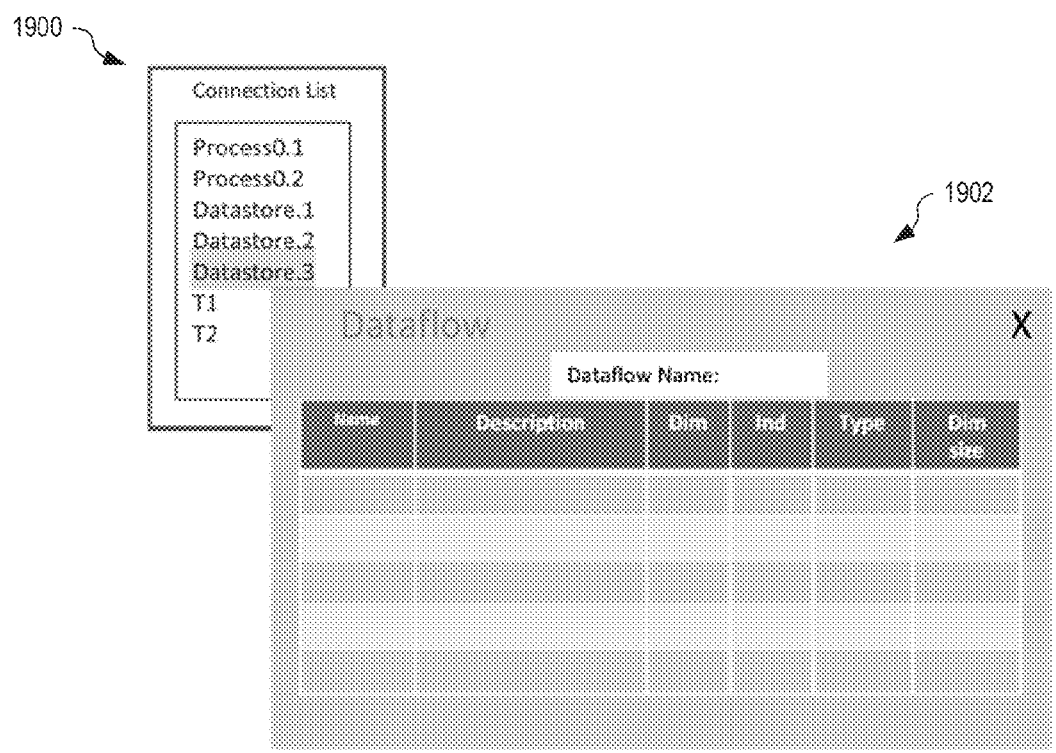
FIG. 19 shows one exemplary graph object list that is displayed when the developer selects "Pass Data" option from the option list of FIG. 7.

Right-clicking on the saved process within table 900 (or on sub-graph interaction screen 604) displays options list 700, FIG. 7, for the process. FIG. 19 shows one exemplary graph object list 1900 that is displayed when the developer selects "Pass Data" option 704 from option list 700. List 1900 defines valid graph objects to which to process 1802 may connect. Selecting any one of the listed graph objects displays a popup 1902 that allows the developer to name the data flow. The variables displayed in popup 1902 define the variables that are transferred via that dataflow (either input or output). The names, descriptions, DIMs, IND, type, and DIM size of the variables cannot be changed.

Different Graph Views

Because of the hierarchical nature of the MPT Hierarchical Decomposition Graph (e.g. graph 200 of FIG. 2), three graphical views are possible: the global view, the level view, and the decomposed-process view.

Global View

Figure 20:
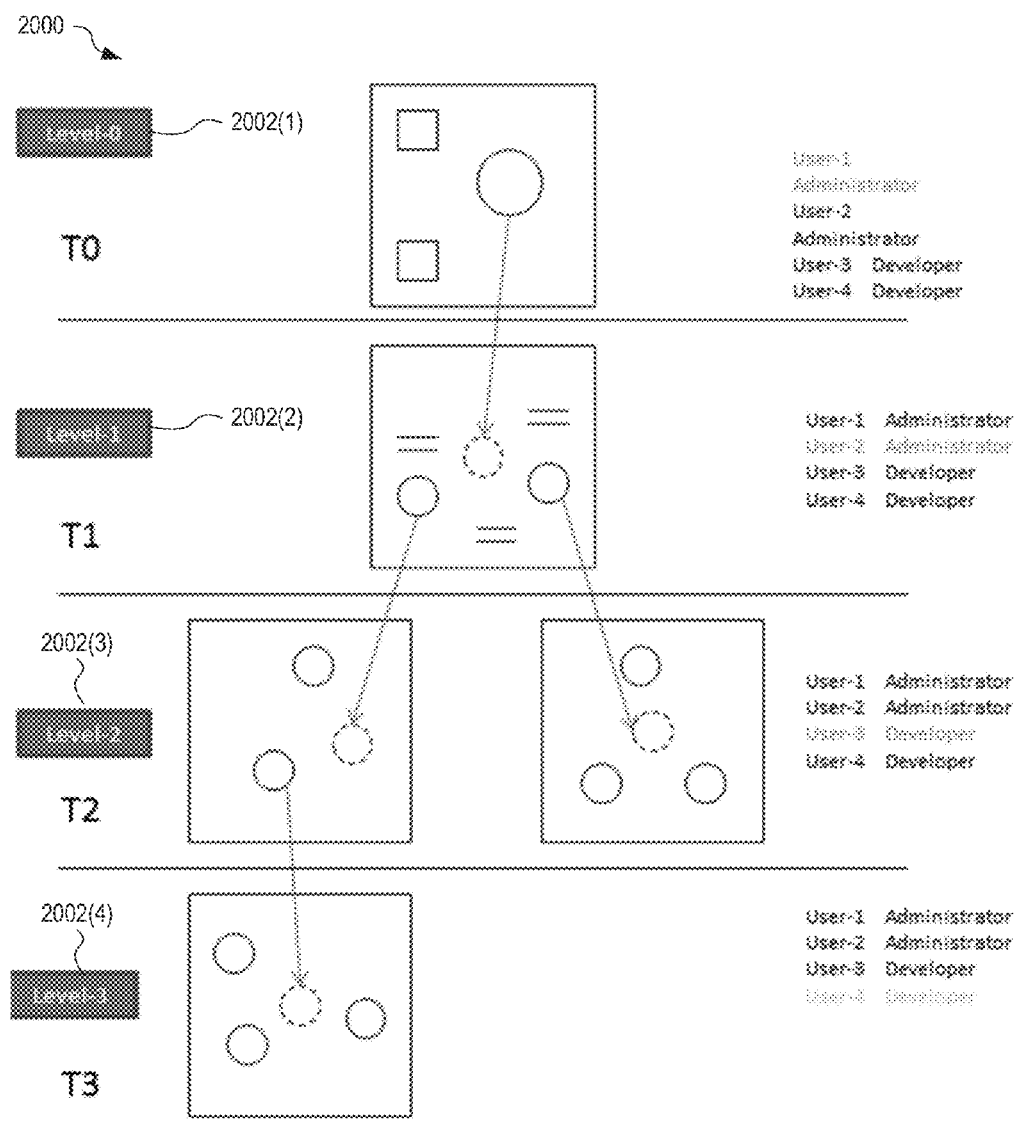
FIG. 20 shows one exemplary global view of software design of FIG. 1 in the form of a hierarchical decomposition graph.

FIG. 20 shows one exemplary global view 2000 of software design 110 of FIG. 1 in the form of a hierarchical decomposition graph. Global view 2000 shows all decomposition levels of software design 110 together. Global view 2000 graphically shows the following: the relationships among different levels of process elements, the location of developers/administrators, developer access or privilege information, level-based test completeness (T0, T1, T2, T3), and level-based work-completeness percentage. The test completeness is defined as follows: T0=at least one process on the associated decomposition level lacks a test procedure, T1=every process on the associated decomposition level has at least one test procedure, T2=every control-flow condition attached to every process has at least one test procedure, and T3=every control-flow condition attached to every process has at least one test procedure for the minimum, maximum and nominal dataset values that may occur for that control-flow condition. A control-flow condition defines which data values and prior compute states allow access to the current process.

To access a particular decomposition level from global view 2000, the developer selects the appropriate "Level-x" button 2002. In the example of FIG. 20, "User-x" represents the name of a developer that has at least "view" privileges at the associated level. "Administrator" is a label associated with a user identified as an administrator, and "Developer" is a label associated with a user identified as a developer. A user whose name is written in green has edit privileges while a user whose name is written in orange has view-only privileges.

Level View

Figure 21:
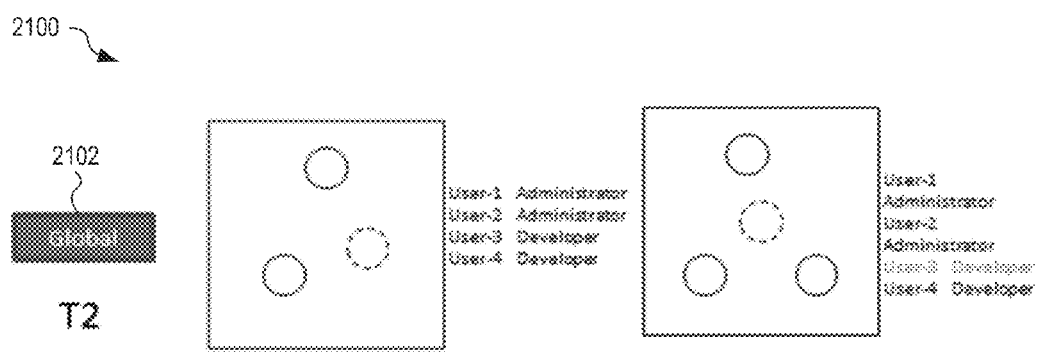
FIG. 21 shows one exemplary decomposition level view that provides details of one decomposition level of software design of FIG. 1.

FIG. 21 shows one exemplary decomposition level view 2100 that provides details of one decomposition level of software design 110 of FIG. 1. All of the same information displayed for the entire graph in global view 2000 of FIG. 20 is displayed for each decomposition level. Double left-clicking on a sub-graph on the current level causes the Decomposed Process View to be displayed. Since level view 2100 shows the details of one particular decomposition level, the "Level" button 2002 is not shown. Selecting a Global button 2102 returns to display global view 2000.

Decomposed Process View

Figure 22:
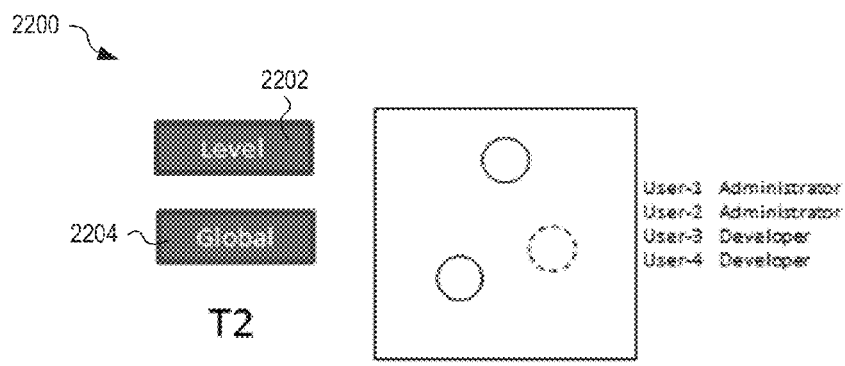
FIG. 22 shows one exemplary decomposed-process view that provides details of one particular sub-graph of software design of FIG. 1.

FIG. 22 shows one exemplary decomposed-process view 2200 that provides details of one particular sub-graph of software design 110 of FIG. 1. All of the same information shown for a level is shown for a sub-graph. Double left-clicking on the sub-graph causes "sub-graph interaction" screen 604 of FIG. 6 to be displayed. From "Sub-graph Interaction" screen 604, selection of a "Decomp" button 606 causes system 100 to return to decomposed-process view 2200, selection of a Level button 2202 causes system 100 to return to level view 2100, and selection of Global button 2204 causes system 100 to return to global view 2000.

Sub-Graph Interaction Screen

Figure 23:
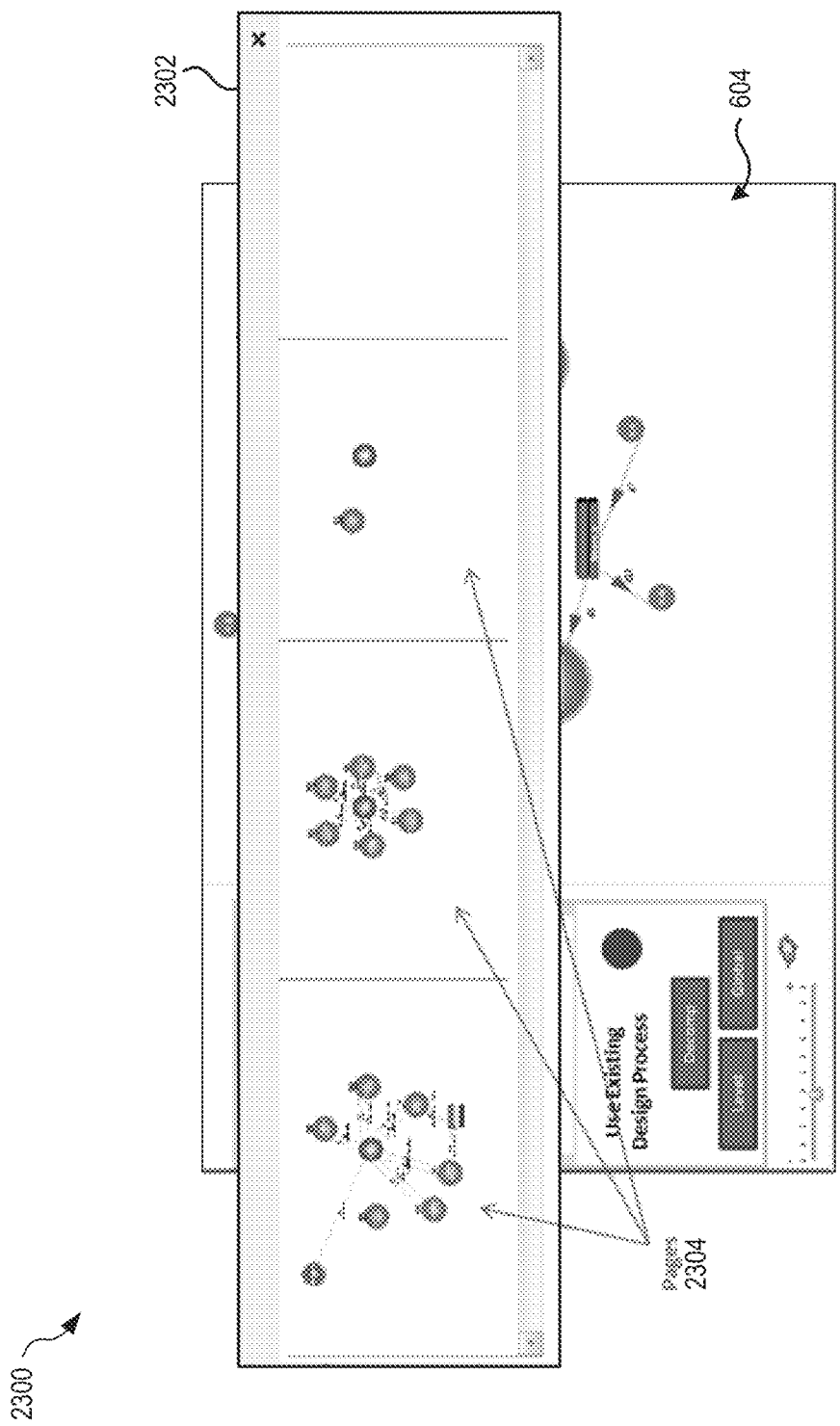
FIG. 23 shows one exemplary screenshot illustrating a page view screen including one or more portions of one particular sub-graph of software design of FIG. 1.

FIG. 23 shows one exemplary screenshot 2300 illustrating a page view screen 2302 including one or more portions of one particular sub-graph of software design 110 of FIG. 1. The "sub-graph interaction" screen 604 is the primary working area for graph manipulation. Page view screen 2302 may be displayed concurrently, or on top of sub-graph interaction screen 604 such that the sub-graph may be easily navigated. Page view screen 2302 is composed of multiple "pages" 2304. Each page 2304 shows a portion of the same sub-graph (i.e., to ensure that the complexity of any part of the sub-graph is manageable).

To access a particular page 2304 of the current sub-graph, the user double-clicks the desired page.

Graph Execution Optimization

Figure 24:
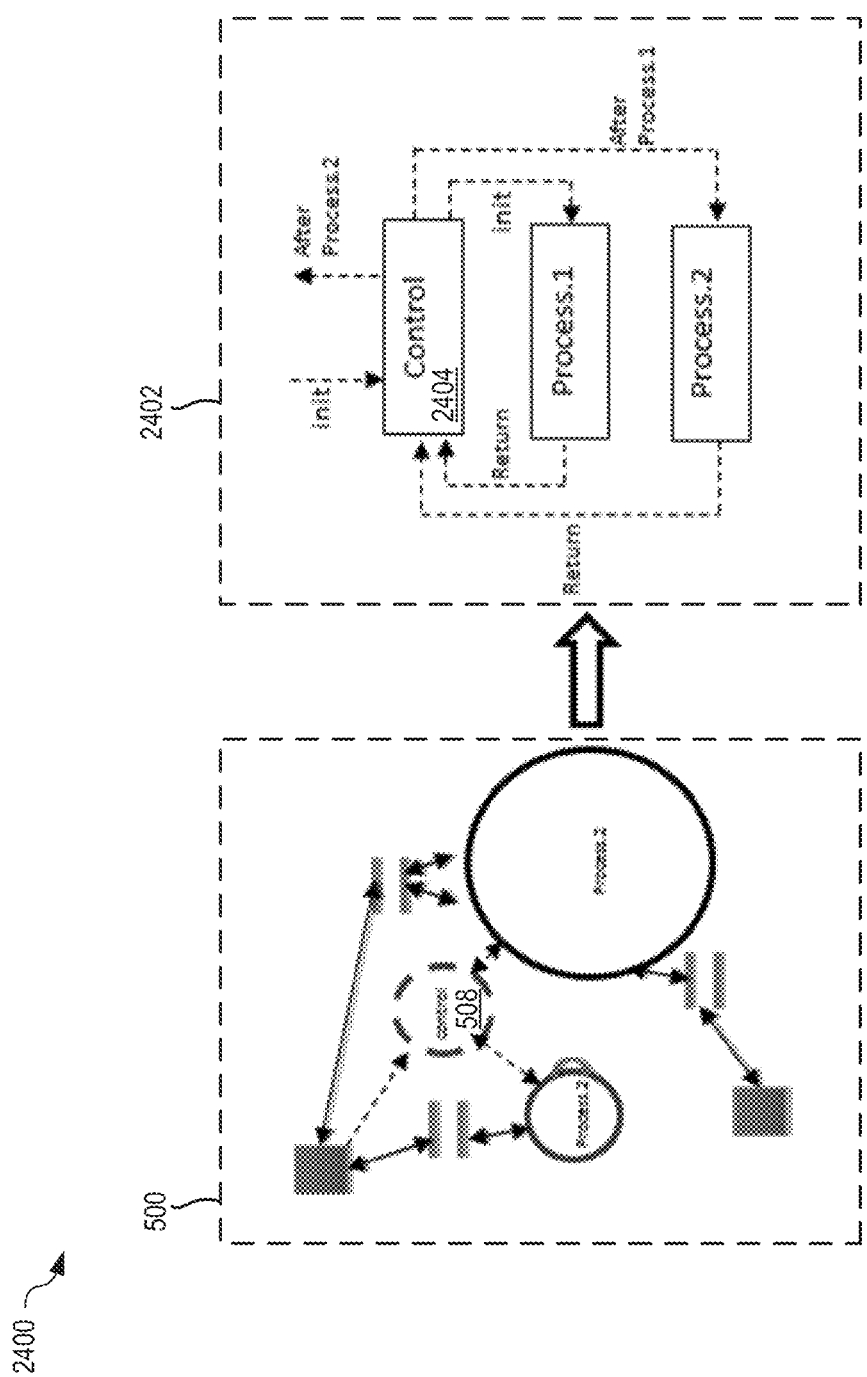
FIG. 24 depicts an exemplary conversion view of a conversion of decomposition level of FIG. 5, into a finite state machine.

FIG. 24 depicts an exemplary conversion view 2400 of a conversion of decomposition level 500, of FIG. 5, into a finite state machine 2402. Because an MPT Hierarchical Decomposition Graph is executable (i.e. the processes are accessed from the control flows), serial-code performance is important. The MPT Hierarchical Decomposition Graph is converted into a finite state machine which is then executed. As an example, decomposition level 500, of FIG. 5, generates the finite state machine 2402. Within finite state machine 2402, control 2404 (i.e. control 508) provides the sequencing of the processes. There is a performance problem when every process returns back to control 2404, potentially doubling the number of transitions per process; the following is an example:

Finite state machine 2402 operates as follows. The control process is called via the "init" condition on its external input control flow. The control process calls "process.1" using the "init" condition.

When "process.1" is complete, it calls the control 2404 with a "return" condition. The "return" condition provides information on the transitioning process; in this case the transitioning process is "process.1".

Control 2404 calls "process.2" using the "After Process.1" condition. When "process.2" is complete, it calls the control process using a "return" condition.

Control 2404 exits after receiving the "return" condition from "Process.2".

Figure 25:
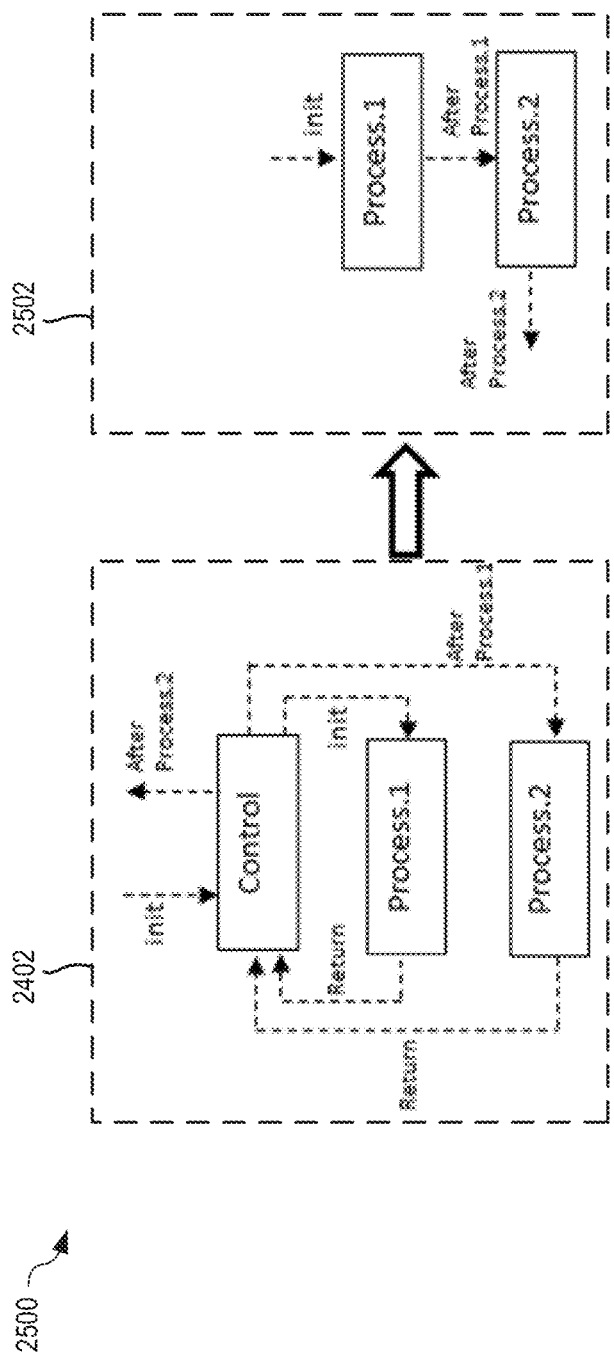
FIG. 25 shows a conversion view converting finite state machine of FIG. 24 into optimized finite state machine.

The processing performance may be increased if the finite state machine 2402 recognizes sequencing, changing the finite state machine to the finite state machine as illustrated in FIG. 25.

FIG. 25 shows a conversion view 2500 converting finite state machine 2402 into optimized finite state machine 2502. Optimized finite state machine 2502 gives the following transitions:

"Process.1" is called via the "init" condition on its external control flow.

"Process.1" calls "process.2" using a "After Process.1" condition

"Process.2" exits using its "After Process.2" condition.

The optimized finite state machine 2502 has only three transitions compared to the six transitions of the original finite state machine 2402. There are two conditions which require the control process: a loop across associated processes and managing multiple unassociated processes.

Figure 26:
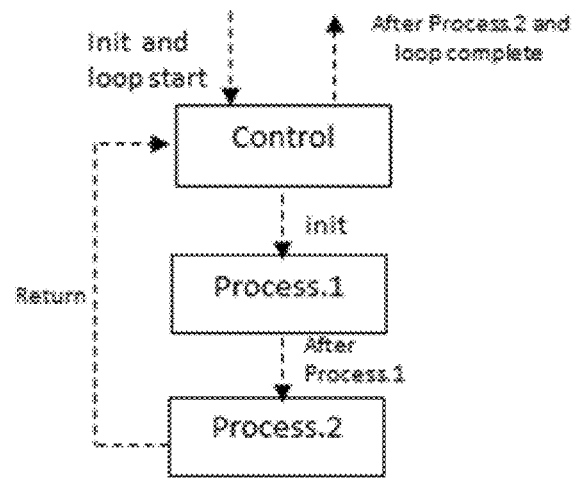
FIG. 26 shows an exemplary optimized finite state machine with outer loop.

If the containing process has a loop and the processes of the current finite state machine are associated then the control process is required to manage the looping indexes. This would change the optimized finite state machine 2502 to the optimized finite state machine with outer loop 2600 as illustrated in FIG. 26

Figure 27:
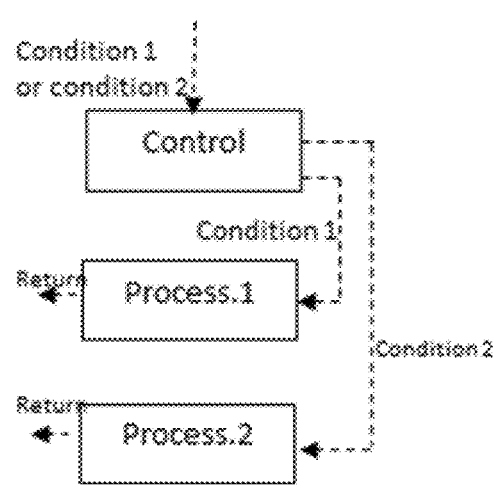
FIG. 27 shows an exemplary finite state machine with unassociated processes.

If the processes of the MPT finite state machine 2402 are unassociated then the control process is used to correctly identify which process is to be accessed. This changes the optimized finite state machine 2502 to the optimized finite state machine with unassociated processes 2700, as illustrated in FIG. 27:

Within the optimized finite state machine with unassociated processes 2700, associated processes are linked together via sequencing; that is, every associated process in a particular finite state machine (other than the control process and the first non-control process) has an "after" clause as part of every one of its calling state transitions. Unassociated processes do not have an "after" clause in their calling state transitions.

Merged Levels

MPT's Finite State Machine Execution model represents a new and unique form of computer language. In computer science, there are three general types of languages: Assembly, Compiled, and Interpreted.

1) Assembly languages—a computer language that is translated into machine-readable form. This translation is analogous to compiling if it is translated into micro-code (not all machines use micro-code).
2) Compiled languages—a computer language that is translated into either byte code for interpretation or machine code for direct machine execution.
3) Interpreted languages—a computer language that is indirectly, via an interpreting computer program, executed.

Assembly code is typically the fastest computer code; however, modern compilers have greatly narrowed the performance gap. The difficulty in writing assembly code typically far outweighs the performance gains obtained. Most modern computer programs are written in compiled or interpreted languages. Compiled languages have far greater execution performance than interpreted languages; however, they are less flexible. In an interpreted language, time-to-solution may be decreased because the compilation step is missing, shortening the design-code-compile-test cycle to a design-code-test cycle. Thus, quick solutions are typically created using interpreted languages whereas production solutions are typically compiled (if performance is an issue). There are some "mixed" languages, such as LISP, which may freely mix compiled and interpreted code. However, mixed languages may not automatically transform compiled code into interpreted code and back.

Consider that the MPT Hierarchical Decomposition Graph is translated into an executable finite state machine, e.g. as illustrated in FIGS. 24-27. Further, consider that the states at the non-sub-graph process level represent compiled code and the state transitions represent interpreted code. The lowest sub-graph level contains only non-sub-graph processes (processes that do not decompose), by definition. Note a sub-graph is a decomposed process.

Figure 28:
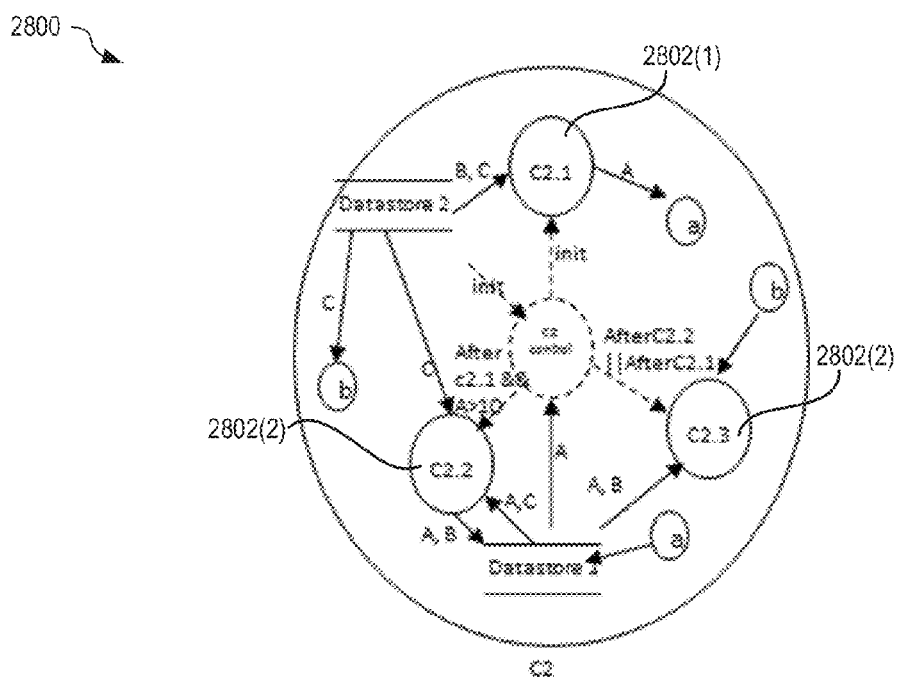
FIG. 28 shows an exemplary lowest level sub-graph.

FIG. 28 shows an exemplary lowest level sub-graph 2800. In FIG. 28, processes 2802(1), 2802(2), and 2802(3) are non-sub-graph processes as they do not decompose further. Processes 2802 are all contained within sub-graph 2800. Non-sub-graph processes contain only assignment and variable-definition statements, not control statements.

Sub-graph 2800 may provide the following assignment statements:

| C2.1 | C2.2 | C2.3 |
| --- | --- | --- |
| B = 1 | B = A + C | A = (A + B + C)/2 |
| C = 2 | A = A * 2 | |
| A = B + C | | |

Figure 29:
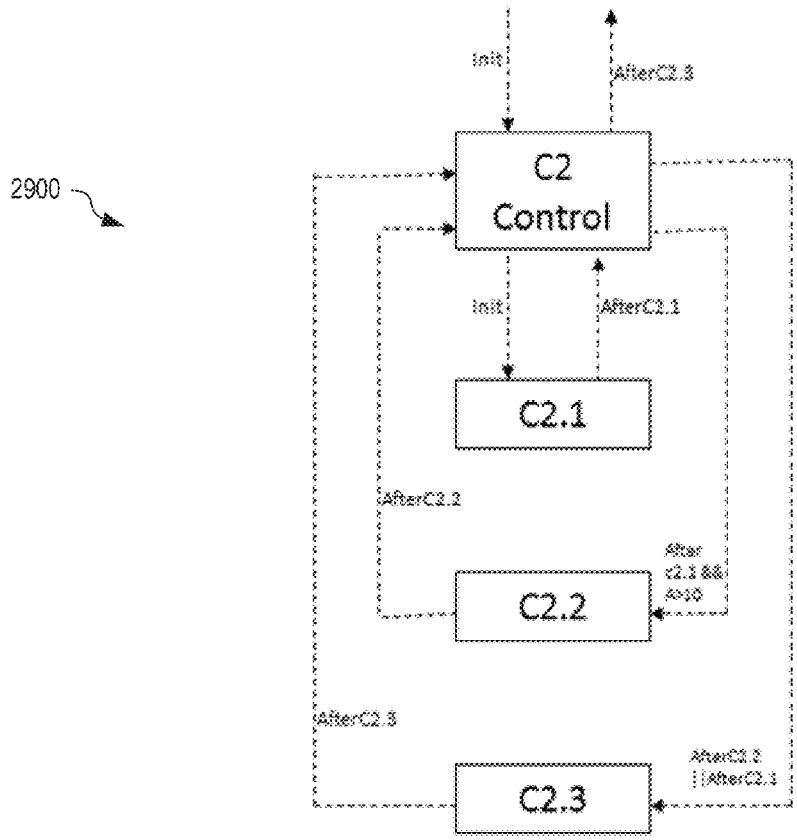
FIG. 29 shows an exemplary finite state machine based upon the sub-graph of FIG. 28.

FIG. 29 shows an exemplary finite state machine 2900 based upon sub-graph 2800 of FIG. 28. Rather than containing separate internal processes 2802, finite state machine 2900 may contain the merger of processes 2802(1), 2802(2), and 2802(3). The control flows, indicated by dashed lines, shown in FIG. 29 convert to "if" statements and with the "afterxxx" statements added as flags give the following code:

```
C2 (int *A, int *B, int *C)
{
    init = 1;
    int AfterC2_1 = 0;
    int AfterC2_2 = 0;
    int AfterC2_3 = 0;
    If (init)
        {
            *B=1;
            *C=2;
            *A=*B+*C;
            AfterC2_1 = 1;
        }
    If (AfterC2_1 && *A>10)
        {
            *B=*A+*C;
            *A=*A*2;
            AfterC2_2 = 1;
        }
```

-continued

```
    If (AfterC2_2 || (AfterC2_1)
        {
            *A=(*A+*B+*C)/2;
        }
}
```

Figure 30:
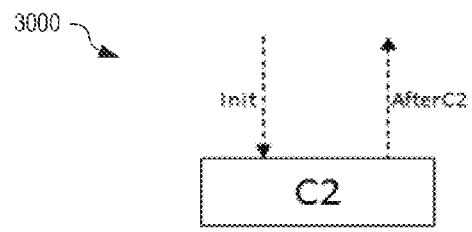
FIG. 30 shows an exemplary finite state machine for merged processes.

Merging the internal processes changes the finite state machine to a finite state machine for merged processes 3000 as illustrated in FIG. 30. Finite state machine for merged processes 3000 represents the compiled code corresponding to the above C2 source code.

Figure 31:
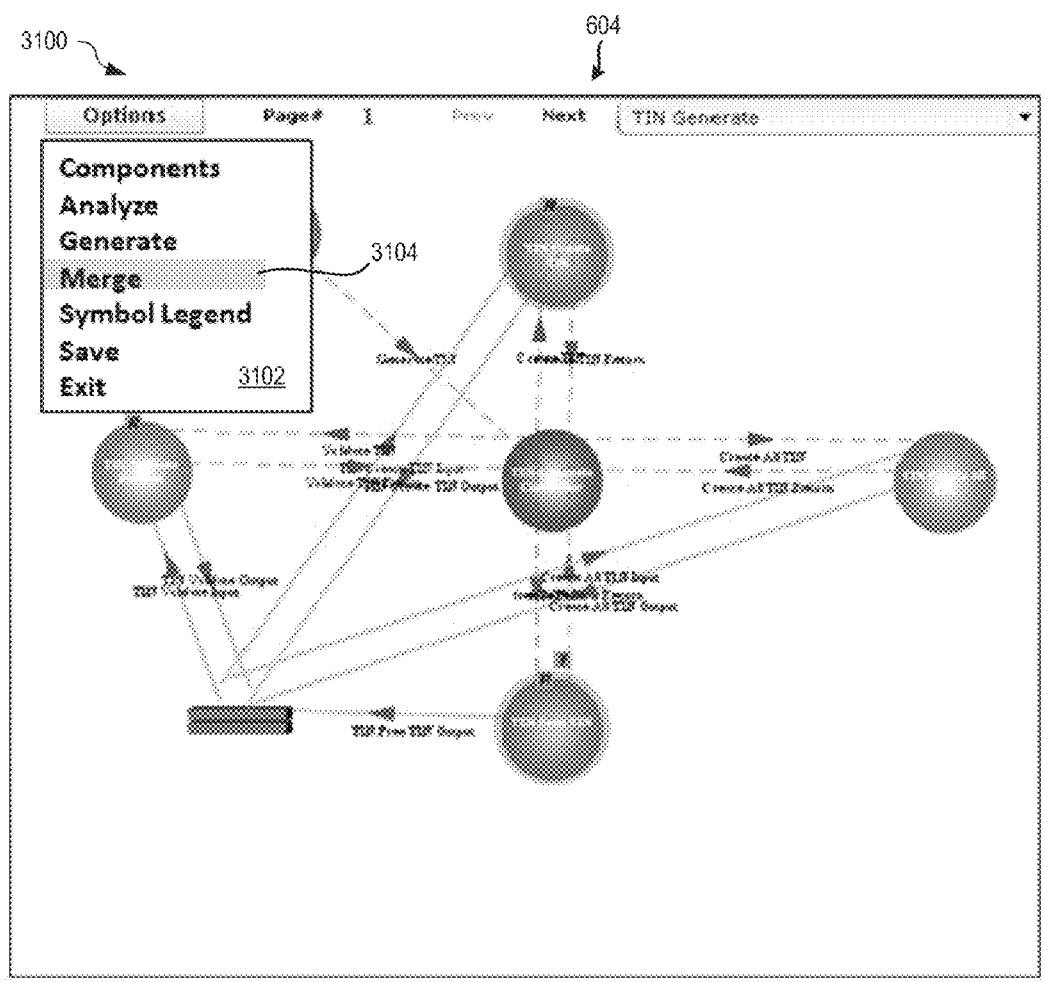
FIG. 31 shows a screenshot including pull-down menu of sub-graph interaction screen of FIG. 6 having a merge option button.
Figure 32:
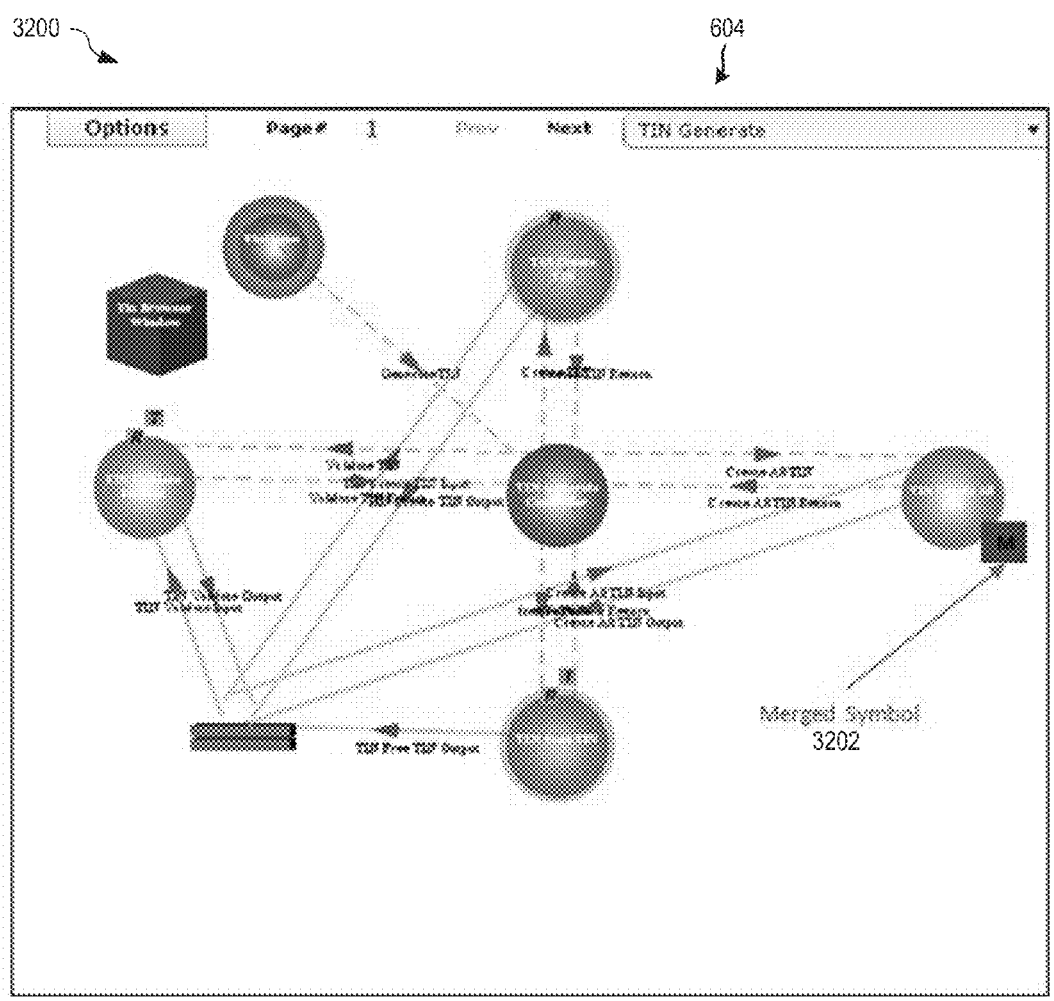
FIG. 32 shows a screenshot of the sub-graph interaction screen of FIG. 6 including a merged symbol.

FIG. 31 shows a screenshot 3100 including pull-down menu 3102 of sub-graph interaction screen 604 having a merge option button 3104. In general, any group of processes at the same decomposition level may be merged. The advantages of merger are: faster processing and the ability to hide underlying functionality (giving Intellectual Property protection). To merge processes, the user first accesses the to-be-merged decomposition level and selects the "Merge" button from the "Options" pull-down menu 3102:

FIG. 32 shows screenshot 3200 of sub-graph interaction screen 604 including a merged symbol 3202. Mergers cannot take place unless there is code associated with all to-be-merged non-control processes. This means that only non-decomposable processes and merged processes may be merged on a sub-graph. If there is a decomposable process on the sub-graph then an error message is displayed and merger does not occur. The merged sub-graph is grayed out on the screen to show that it is not accessible. The process that decomposes into the merged sub-graph is changed to contain the merged symbol (M) 3202.

Once a decomposable process is merged, it may switch from merged to unmerged use. Selecting the "M" merged symbol 3202 causes the symbol to change to "U" for unmerged, and the decomposition level is accessible, modifiable, and executable. Selecting the "U" symbol causes the sub-graph to be re-merged. If there is a non-decomposable process on the to-be merged sub-graph then an error is displayed.

Figure 33:
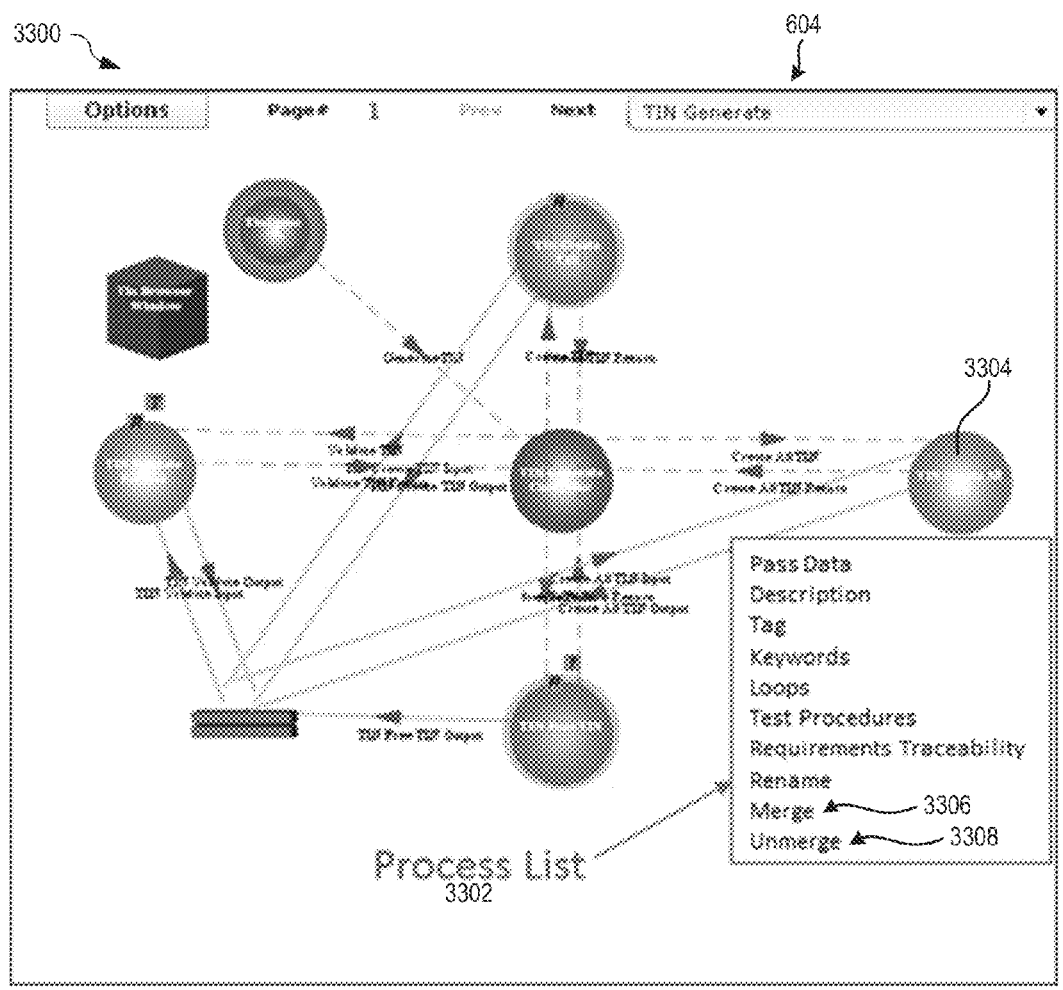
FIG. 33 shows a screenshot of the sub-graph interaction screen of FIG. 6 including a processes option list.

FIG. 33 shows screenshot 3300 of sub-graph interaction screen 604 including a processes option list 3302. Another way to merge a process is to right-click on the decomposable process (i.e. process 3304), which displays the "processes option list" 3302, then select the "Merge" option button 3306. Similarly, unmerging may be accomplished by right-clicking on the decomposable process followed by the selection of the "Unmerge" option button 3308. Since merging increases how much of the code is compiled to binary and un-merging increases how much of the code is compiled, this means that compiled versus interpreted acts simply as different views of the same code rather than different states of the code.

Group Merge

Figure 34:
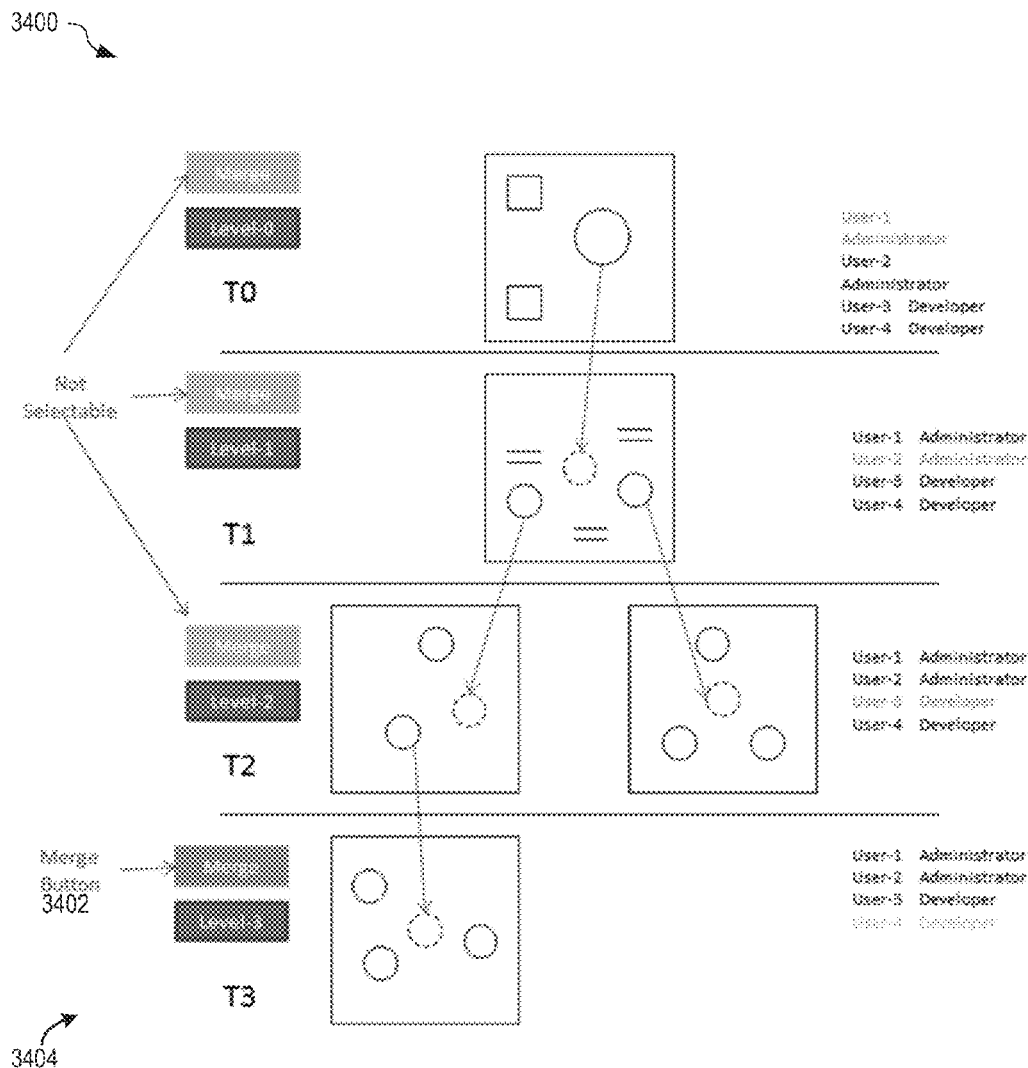
FIG. 34 depicts a global view of software design of FIG. 1 including selectable merge button on the bottom most level.

FIG. 34 depicts a global view 3400 of software design 110 including selectable merge button 3402 on the bottom most level 3404. Merging and un-merging code does not have to be performed at the single process/sub-graph level. Consider that at the bottom-most level 3404 of the graph no process decomposes. This means that it is possible to start at the bottom-most graph level and merge/un-merge all of decomposed processes on that level. Activating "Merge/Unmerge" button 3402 on the bottom-most level 3404 allows the developer to safely perform a group merge/un-merge. Once a level has been merged, then the next level up may be merged. This process may be continued indefinitely.

Figure 35:
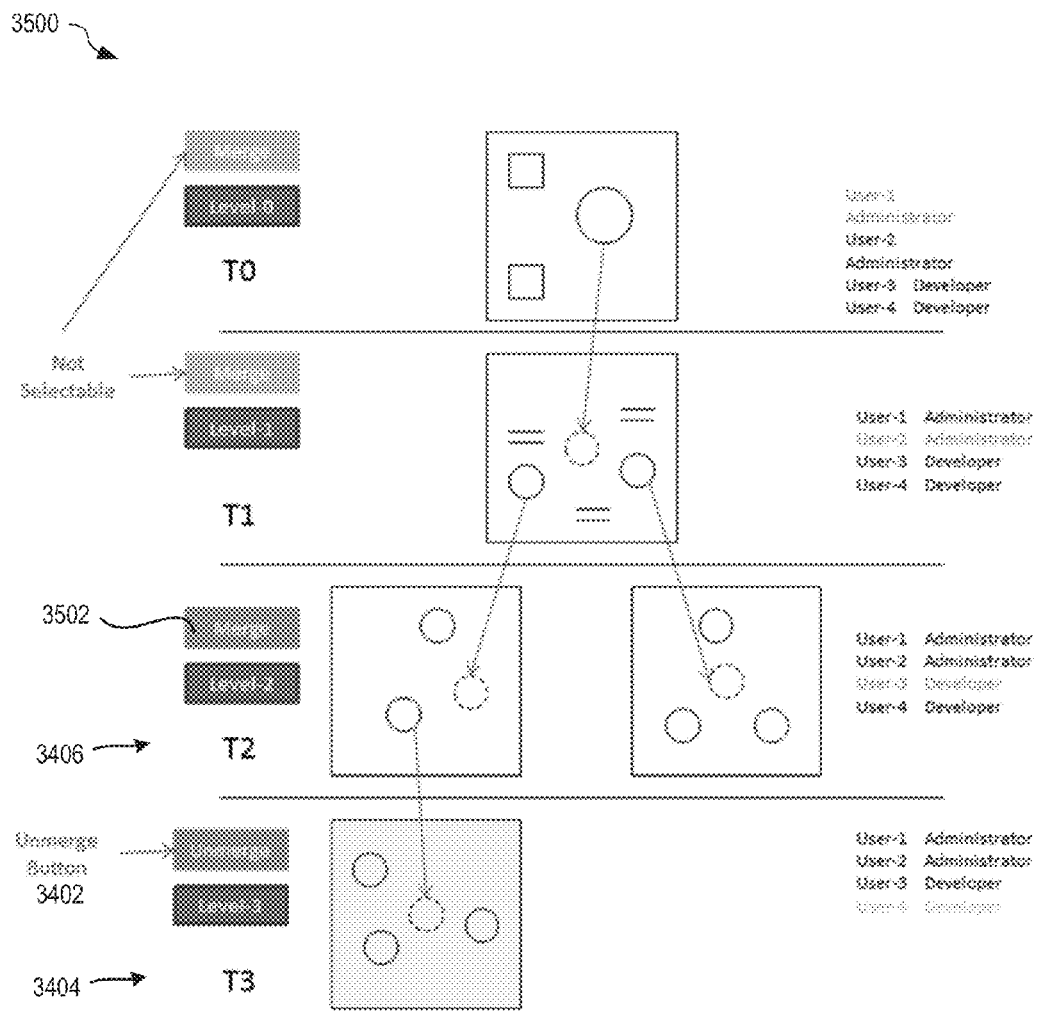
FIG. 35 depicts the global view of FIG. 34 with selectable merger button on the second bottom most level.

FIG. 35 depicts global view 3400 of FIG. 34 with selectable merger button 3502 on the second bottom most level 3406. At first only the bottom-most "Merge" button 3402 is active. Selecting the active merge button 3402 cause the sub-graph to be merged. Merger is depicted by the sub-graphs on the bottom most level 3404 being grayed out. The bottom most merge button 3402 then changes to un-merge and the second bottom most merge button 3502 on the next level up is activated.

Figure 36:
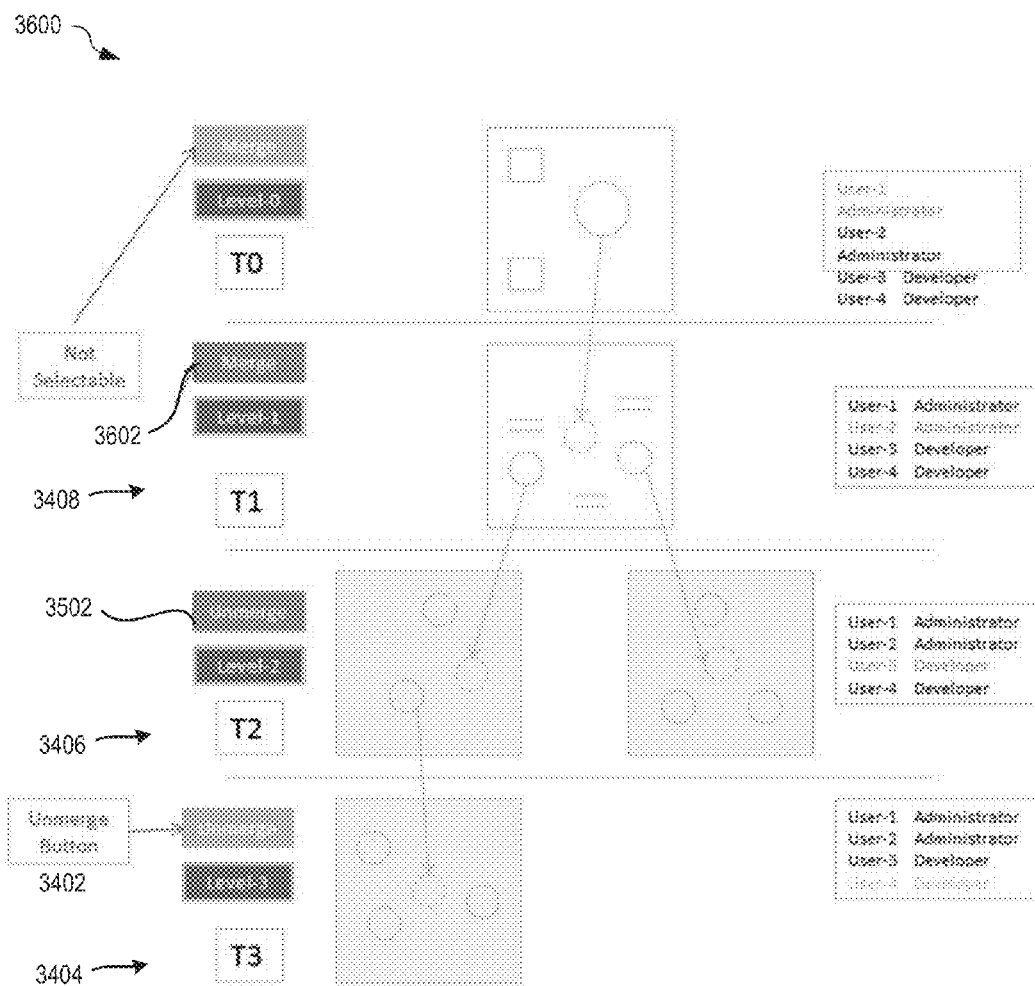
FIG. 36 depicts the global view of FIG. 34 with selectable merger button on the third bottom most level.

FIG. 36 depicts global view 3400 of FIG. 34 with selectable merger button 3602 on the third bottom most level 3408. Selecting the next active merge button 3502 causes level 3406 to be grayed out (and merged) and the merge button changes 3502 to un-merge while the bottom most level button 3402 is grayed out and the merge button 3602 on the third from bottom most level 3408 is activated.

Conclusion

This document has described the MPT Hierarchical Design model, how to convert hierarchical design elements into reusable elements, and a reusable design-element sharing process. The ability to merge sub-graph information into a process was also discussed.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for implementing a hierarchical software design formed of a plurality of decomposition levels each comprising a control, at least one process, wherein each decomposable process has a corresponding sub-graph, and where each non-decomposable processes has associated code that implements functionality of the process, comprising:
    translating one of the decomposition levels directly into an executable finite state machine having:
        a plurality of states including one state corresponding to the control and additional states each respectively corresponding to one of the non-decomposable processes and formed of executable code associated with the non-decomposable process; and
        state transitions formed of interpreted code that represents control flow between the control state and the additional states defined within sub-graphs of the decomposable processes; and
    interpreting the state transitions to invoke execution of the states to implement the hierarchical software design.

2. The method of claim 1, further comprising translating the executable finite state machine into an optimized executable finite state machine by altering the state transitions such that one of the additional states directly invokes another of the additional states.

3. The method of claim 2, the step of translating the executable finite state machine into an optimized executable finite state machine further comprising removing the control state when the decomposition level includes associated processes without a looping condition.

4. The method of claim 2, the step of translating the executable finite state machine into an optimized executable finite state machine further comprising inserting a looping state transition between one of the additional states and the control state, and a looping end state transition from the control state when the decomposition levels includes a loop across associated processes therein.

5. The method of claim 2, the step of translating the executable finite state machine into an optimized executable finite state machine further comprising inserting (a) a first conditional state transition between a first one of the additional states and the control state, and (b) a second conditional state transition between a second of the additional states and the control state when the decomposition levels includes multiple unassociated non-decomposable processes.

6. The method of claim 1, further comprising:
    merging two of the non-decomposable processes to form one of the states based upon a merge indicator for each of the two processes within the hierarchical software design;
    generating, within the one of the states, conditional statements and flags based upon control flow for the two processes; and
    compiling the conditional statements and flags with code of the two processes to form the one of the states.

7. The method of claim 6, wherein after the step of merging, the functionality details of the individual merged processes is hidden.

8. The method of claim 6, wherein after the step of merging, a processing time of processing the hierarchical software design is reduced.

9. A method for implementing a hierarchical software design formed of a plurality of decomposition levels each comprising a control, at least one process, wherein each decomposable process has a corresponding sub-graph, and where each non-decomposable processes has associated code that implements functionality of the process, comprising:
    merging two of the non-decomposable processes to form one of the states based upon a merge indicator for each of the two processes within the hierarchical software design;
    generating, within the one of the states, conditional statements and flags based upon control flow for the two processes; and
    compiling the conditional statements and flags with code of the two processes to form the one of the states.

10. The method of claim 9, wherein after the step of merging, the functionality details of the individual merged processes is hidden within the hierarchical software design.

11. The method of claim 9, wherein after the step of merging, a processing time of processing the hierarchical software design is reduced.

* * * * *